(12) United States Patent
Willard, Jr. et al.

(10) Patent No.: US 6,994,133 B2
(45) Date of Patent: Feb. 7, 2006

(54) LOW OR NO PRESSURE USAGE INDICATOR FOR A TIRE

(75) Inventors: Walter Lee Willard, Jr., Greenville, SC (US); Kenneth Johnson, Taylors, SC (US); Richard Bryant, Spartanburg, SC (US)

(73) Assignee: Michelin Recherche et Technique S.A., (CH)

( * ) Notice: Subject to any disclaimer, the term of this patent is extended or adjusted under 35 U.S.C. 154(b) by 263 days.

(21) Appl. No.: 10/262,260

(22) Filed: Oct. 1, 2002

(65) Prior Publication Data

US 2004/0060629 A1 Apr. 1, 2004

(51) Int. Cl.
*B60C 23/00* (2006.01)
*B60C 23/06* (2006.01)
*B60C 11/24* (2006.01)
(52) U.S. Cl. .................... 152/152; 152/154.2; 73/146; 73/146.2
(58) Field of Classification Search .................. 73/146, 73/146.2; 152/154.2, 516
See application file for complete search history.

(56) References Cited

U.S. PATENT DOCUMENTS

| 4,074,742 A | | 2/1978 | Chamblin |
| 4,134,357 A | * | 1/1979 | Chesley .................... 116/34 A |
| 4,226,274 A | | 10/1980 | Awaya et al. |
| 5,171,394 A | | 12/1992 | Laurent |
| 5,427,166 A | | 6/1995 | Willard, Jr. |
| 5,634,993 A | | 6/1997 | Drieux et al. |
| 5,700,339 A | | 12/1997 | Billieres |
| 5,868,190 A | | 2/1999 | Willard, Jr. et al. |
| 5,891,279 A | | 4/1999 | Lacour |
| 5,962,778 A | * | 10/1999 | Billieres ...................... 73/146 |
| 6,494,543 B1 | * | 12/2002 | Hashimura et al. .... 301/95.101 |
| 6,536,368 B2 | * | 3/2003 | Hendrie .................... 116/34 A |
| 6,769,294 B2 | * | 8/2004 | Yurjevich et al. ............. 73/146 |

FOREIGN PATENT DOCUMENTS

EP 0557091 * 8/1993

* cited by examiner

*Primary Examiner*—Blaine Copenheaver
*Assistant Examiner*—Justin Fischer
(74) *Attorney, Agent, or Firm*—Dority & Manning, P.A.

(57) ABSTRACT

A low or no pressure use indicator for use on a tire is provided. The tire has a crown and a pair of sidewalls that extend from the crown. Each of the sidewalls has a bead located on an end of the sidewall that is opposite from the crown. The low or no pressure use indicator is located on a wall of one of the sidewalls. The low or no pressure use indicator is configured for indicating by a permanent physical change whether the tire has been subjected to an operation condition of an undesirable amount of low tire pressure.

19 Claims, 7 Drawing Sheets

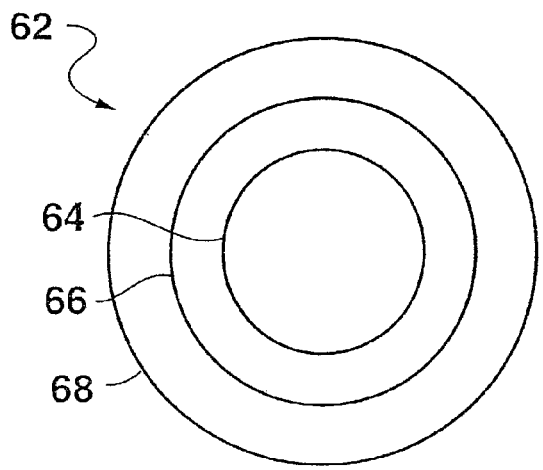
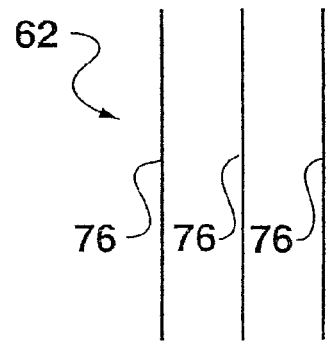
FIG. 7A   FIG. 7B
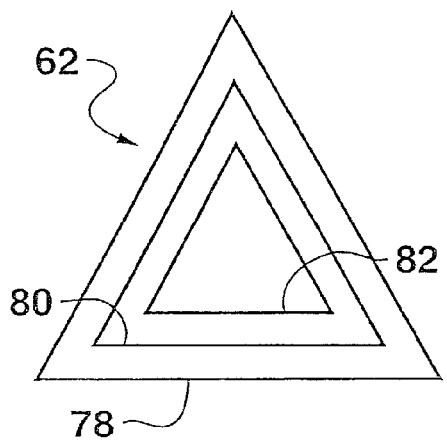
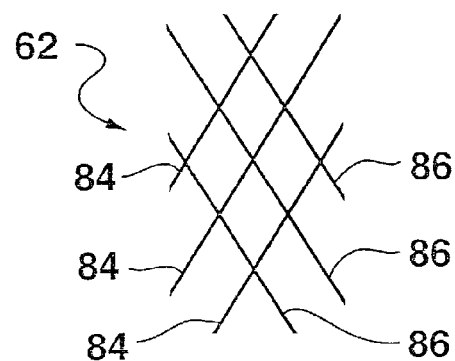
FIG. 7C   FIG. 7D
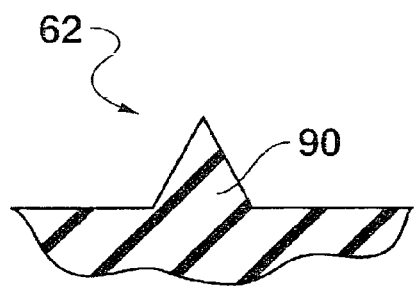
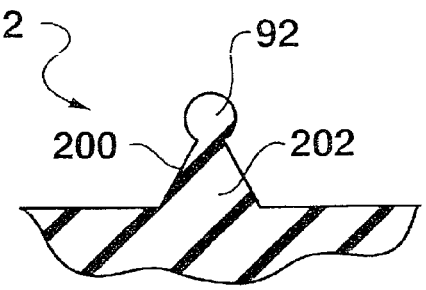
FIG. 8A   FIG. 8B

LOW OR NO PRESSURE USAGE INDICATOR FOR A TIRE

TECHNICAL FIELD

The present invention relates generally to tires and tire assemblies for pneumatic tubeless tires. More particularly, the present invention relates to a low or no pressure use indicator provided on a tire for indicating whether the tire has been subjected to undesirable operation at low or no tire pressure.

BACKGROUND

During the twentieth century, tire designers and manufacturers have conceived of various designs with which to enable a pneumatic tubeless tire to continue to function even after a loss of air pressure. Generally, a tubeless tire is made of a tread section with two sidewalls. Beads are located at the end of each sidewall and are typically rigid. The beads fit onto a rim. Putting air pressure into the interior of the tire causes the beads to seat against the rim and securely hold the tire onto the rim.

The design and use of a run-flat tire is desirable for several reasons. First, sudden loss of air pressure in a tire can result in a shifting of the position of the tire, and subsequently a change in the internal tensioning forces originally imparted by the tire on the rim to hold the tire thereon. The tire may become disengaged from the rim under certain circumstances.

Second, a loss of air pressure forces the tread of the tire onto the rim. The rim must then assume the loading from the weight of the vehicle and the dynamic forces of the ride. As the rim is not designed for this purpose, damage to either the rim, wheel, axle, or suspension can result. This in turn can lead to costly repairs in addition to leaving the driver and passenger stranded once the rim is too severely damaged to continue riding.

One such design of a run-flat tire is disclosed in U.S. Pat. No. 5,427,166 to Willard, Jr., which is owned by the assignee of the present invention and is incorporated by reference herein in its entirety for all purposes. This tire has thickened sidewalls which are designed to bear the load of the vehicle in the event of loss of tire inflation pressure.

Another run-flat type tire is the vertically anchored tire disclosed in U.S. Pat. No. 5,891,279 which uses a flexible insert mounted on the wheel rim to support the vehicle load if the tire loses inflation pressure.

Run-flat tires are desirable over conventional tires because with reasonable and appropriate action by the driver, such tires can allow limited, continued mobility for travel to a location where the tire can be inspected, repaired, or replaced as necessary.

It is sometimes the case that run-flat tires, and also conventional tubeless tires, are driven in a condition where they are subjected to lower than normal operating pressure. In such instances, pressure loss will only be severe enough to cause the sidewall of the tire to flex. Flexing in these circumstances will impart stress on the sidewall of the tire and possibly other areas as well. Although designed to accommodate some degree of flexing, sustained flexing or severe flexing of a tire may lead to the tire being damaged and unsuitable for further use.

Therefore, it is desirable to have an indication whether a tire has been too severely damaged after experiencing a condition of lower than normal operating pressure. If the tire has been subjected to an acceptable amount of stress, a technician or motorist may repair the tire for continued use. If the tire was too severely damaged, the technician or motorist may discard the damaged tire and install a new one.

Typically, if a conventional tire has been subjected to a condition of low tire pressure, "wrinkles" will develop on the inside and/or outside of the sidewalls of the tire. The wrinkles are cracks and/or marks due to stress brought about from an unacceptable degree of flexing of the tire. Run-flat tires may also exhibit wrinkles if operated in a condition or undesirable low tire pressure. Tires are typically deemed unfit for further use once the presence of wrinkles is noticed. However, the tire may still be unsafe and/or unfit for further use even when wrinkles are not present. Additionally, wrinkles may sometimes be hard to spot or subject to subjective interpretation by a technician or motorist.

The present invention provides for a low or no pressure use indicator that is located on a tire, either a conventional tire or a run-flat tire, in order to inform a technician or motorist whether the tire has been subjected to an undesirable condition of low pressure.

SUMMARY

Various features and advantages of the invention will be set forth in part in the following description, or may be obvious from the description, or may be learned from practice of the invention.

The present invention provides for a tire for use on a vehicle. The tire has a crown and a pair of sidewalls that extend from the crown. Each of the sidewalls has a bead located on an end of the sidewall that is opposite from the crown. A low or no pressure use indicator is located on a wall of one of the sidewalls. The low or no pressure use indicator is configured for indicating by a permanent physical change whether the tire has been subjected to an operation condition of an undesirable amount of low tire pressure.

Additionally, the present invention includes an exemplary embodiment as described above where the low or no pressure use indicator indicates the condition of an undesirable amount of low tire pressure by a worn or deteriorated area on the low or no pressure use indicator.

According to one embodiment of the invention, the low pressure usage indicator comprises at least one raised feature formed on a sidewall where the sidewall experiences flexing during low pressure operation.

An alternative exemplary embodiment includes an exemplary embodiment as discussed above where the low or no pressure use indicator is at least one raised ridge, which may be in the form of a geometric figure, such as a ring, on the inner, surface of one of the sidewalls. Alternatively, an exemplary embodiment exists where the low or no pressure use indicator is three concentric raised rings on the inner surface of one of the sidewalls.

A further exemplary embodiment of the present invention exists in an exemplary embodiment as discussed above where the low pressure use indicator is at least one raised triangle on the inner surface of one of the sidewalls. Further, another exemplary embodiment exists where the low or no pressure use indicator is three raised triangles all being of different size. The centers of all of the three triangles are located at a common point.

An additional exemplary embodiment exists of a tire and/or a tire assembly as discussed above where the low or no pressure use indicator has a V-shaped cross section.

Also, the low or no pressure use indicator may be in some embodiments, a member that permanently physically changes when subjected to an operation condition of an undesirable amount of low tire pressure, for example, by changing color with increasing temperature, strain, or frequency of flexing.

BRIEF DESCRIPTION OF THE DRAWINGS

FIG. 7A is a schematic view of an exemplary embodiment of a low or no pressure use indicator in accordance with the present invention. The low or no pressure use indicator is a series of coaxial rings.

FIG. 7B is a schematic view of an exemplary embodiment of a low or no pressure use indicator in accordance with the present invention. The low or no pressure use indicator is three substantially parallel straight lines.

FIG. 7C is a schematic view of an exemplary embodiment of a low or no pressure use indicator in accordance with the present invention. The low or no pressure use indicator is a series of three triangles each sharing a common center.

FIG. 7D is a schematic view of an exemplary embodiment of a low or no pressure use indicator in accordance with the present invention. The low or no pressure use indicator is a series of three substantially parallel lines that intersect another set of three substantially parallel lines.

FIG. 8A is a detailed cross sectional view of a low or no pressure use indicator in accordance with an exemplary embodiment of the present invention. The low or no pressure use indicator has a V-shaped cross section.

FIG. 8B is a detailed cross sectional view of a low or no pressure use indicator in accordance with an exemplary embodiment of the present invention. The low or no pressure use indicator has a substantially V-shaped cross section that has a circular member at an apex.

DETAILED DESCRIPTION

Figure 1:
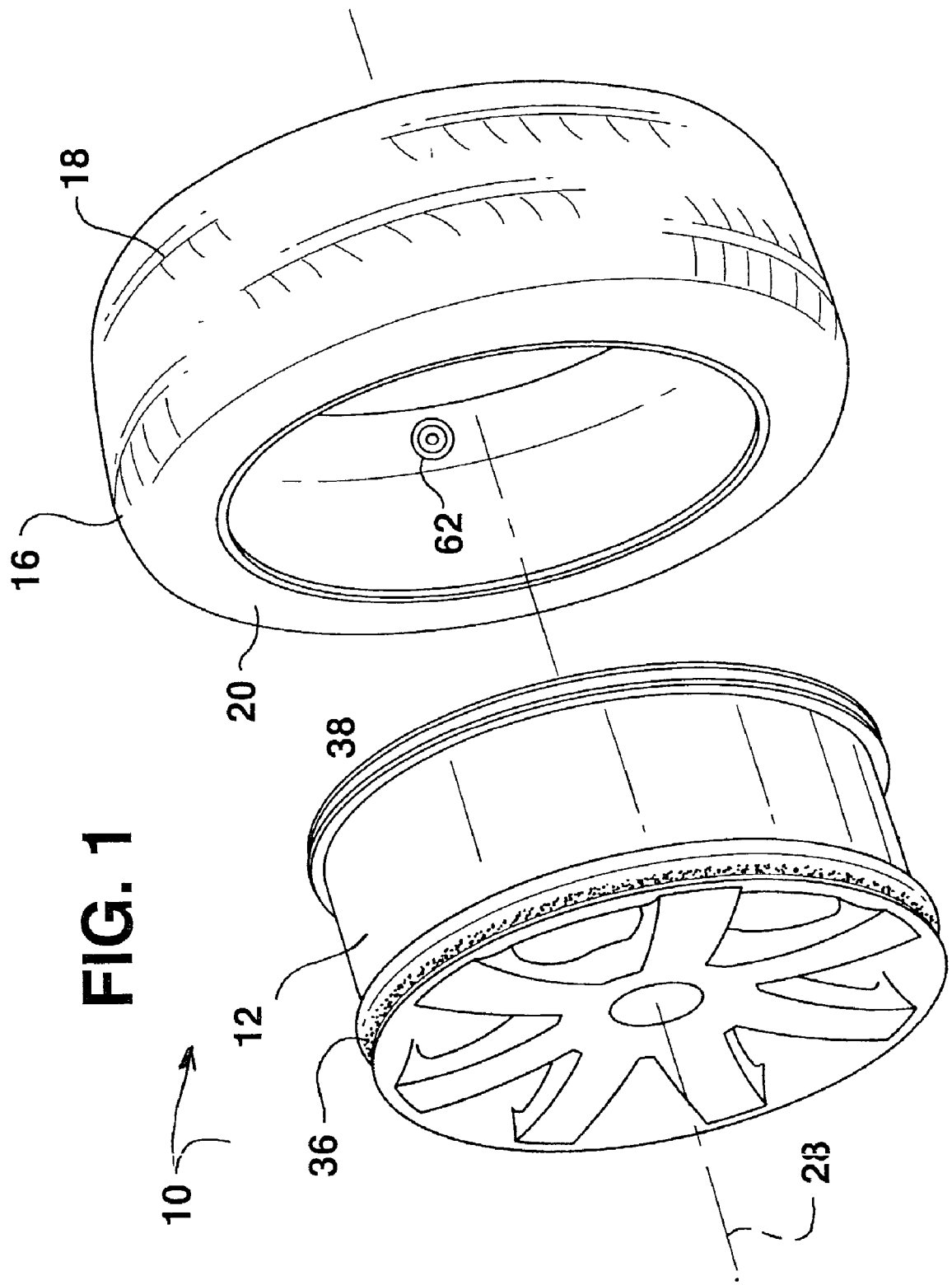
FIG. 1 is an exploded assembly view of an exemplary embodiment of a tire assembly of the present invention.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

Figure 2:
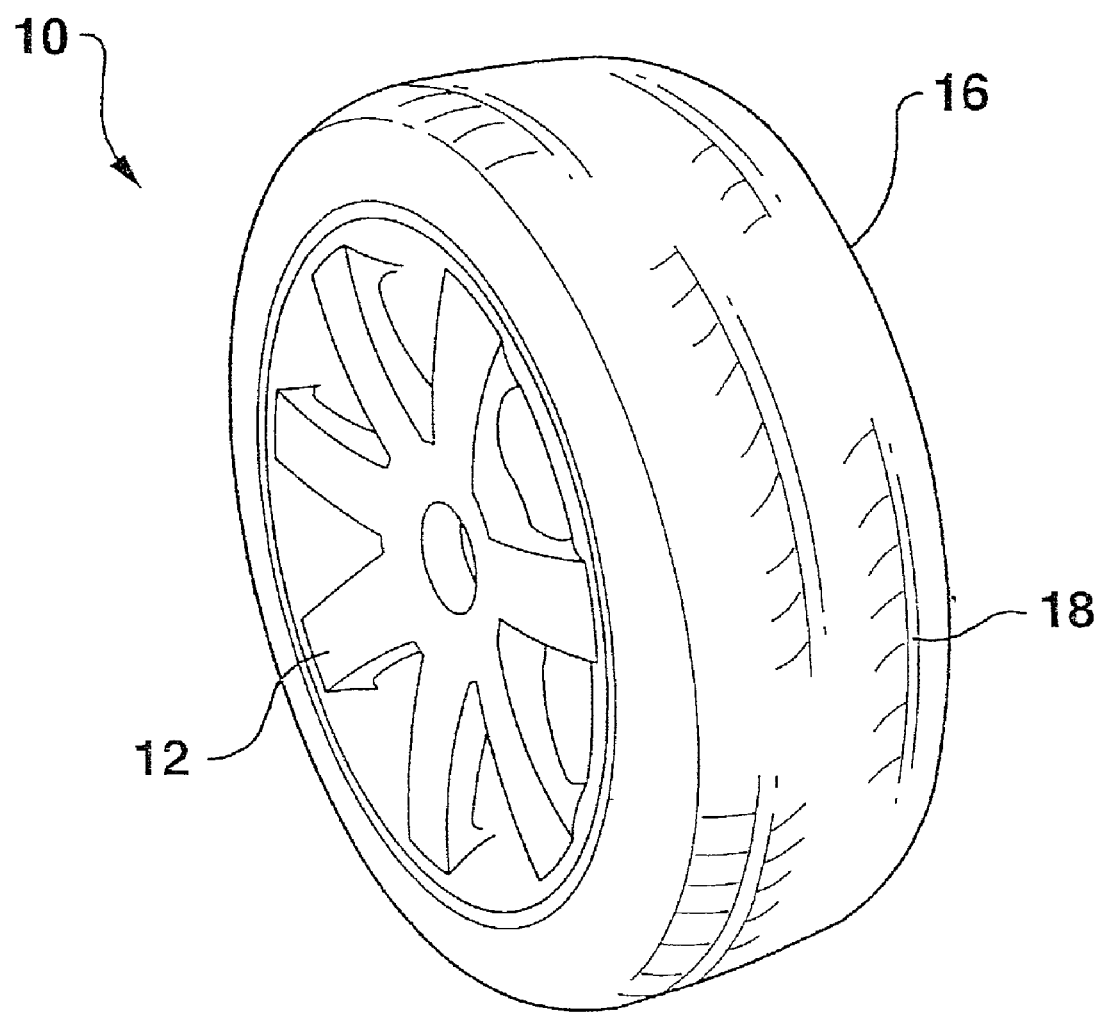
FIG. 2 is a perspective view of the tire assembly shown in FIG. 1.

Referring now to the drawings, a tire assembly 10 in accordance with an exemplary embodiment of the present invention is shown in FIG. 1. The tire assembly 10 is shown as being made of two basic components. An alloy or steel integral wheel rim 12 is provided, and a rubber tire 16 is placed onto the wheel rim 12. The tire assembly 10 is shown in an assembled state in FIG. 2. The tire 16 may be vertically anchored to the wheel rim 12 as described in U.S. Pat. No. 5,634,993 that is assigned to the assignee of the present invention and incorporated herein for all purposes in its entirety.

Although not shown in the exemplary embodiment shown in FIG. 1, a support member (not shown) may be present on the wheel rim 12 in order to help carry the static and dynamic loading when the tire 16 loses air pressure. For instance, the support member may be configured as that shown in U.S. Pat. No. 5,891,279 that is assigned to the assignee of the present invention and incorporated herein for all purposes in its entirety. Of course, other exemplary embodiments of the present invention do not use a support member.

The tire 16 used in the present invention may be of any type, from a conventional tire to a run-flat tire. One such run-flat tire assembly is disclosed in U.S. Pat. No. 5,868,190 that is assigned to the assignee of the present invention and is incorporated herein in its entirety for all purposes. The run-flat tire disclosed in the '190 patent makes use of specially reinforced sidewalls to help prevent the tire 16 from collapsing after the loss of air pressure. Another example of a run-flat tire that may be used in conjunction with the present invention is disclosed in U.S. Pat. No. 5,427,166 that is assigned to the assignee of the present invention and is incorporated herein in its entirety for all purposes. This particular tire has thickened sidewalls that support loading if air pressure is lost.

During a condition of low or zero tire pressure, the tire 16 will deflect towards the wheel rim 12. This deflection in turn causes higher stress and strains than deflection associated with normal tire operation. The stresses and strains imparted on the tire 16 during a low or zero pressure incident may be so severe as to render the tire 16 unusable. Evidence of stress or strain in a tire 16 may be present due to the formation of "wrinkles" (not shown) on the surface of the tire 16. Typically, these "wrinkles" are circumferentially oriented around the tire 16 and an axis 28 about which the tire 16 rotates. The "wrinkles" are cracks and/or stress marks in the surface of the tire 16. Standard industry repair guidelines call for a technician or motorist to check the tire 16 for the presence of "wrinkles" before repairing a hole or other defect in the tire 16. The presence of "wrinkles" typically eliminates the possibility of repairing and reusing the tire 16.

Zero pressure may be defined as atmospheric or ambient pressure. Low pressure is pressure that is insufficient to support the design load of the tire 16. In some instances, the standard recommended pressure range for a passenger vehicle is from about 26 psi to about 30 psi. As used herein, low pressure is defined as pressure below the design operating pressure of the tire 16 where damage may occur during operation. In some instances, the pressure may be 10 psi or less. Alternatively, in other exemplary embodiments of the present invention, the tire 16 may be designed so that damage occurs during use at any particular low pressure or low pressure range.

The present invention provides for a low or no pressure use indicator 62 seen in one exemplary embodiment in FIG. 1, for allowing a technician or motorist to inspect the tire 16 after a condition of low or zero pressure in order to help determine the severity and/or duration of the low or zero pressure incident. As shown in FIG. 1, the low or no pressure use indicator 62 is shown being on the interior of the tire 16. The low or no pressure use indicator 62 may be located at other positions on the tire 16 in other exemplary embodiments of the present invention. The low or no pressure use indicator 62 may be a raised feature on the surface of the tire 16. In one exemplary embodiment, the low or no pressure use indicator 62 is an arrangement of raised ridge-like elements oriented to cross the area of maximum stress in a sidewall 20 of the tire 16.

Figure 3:
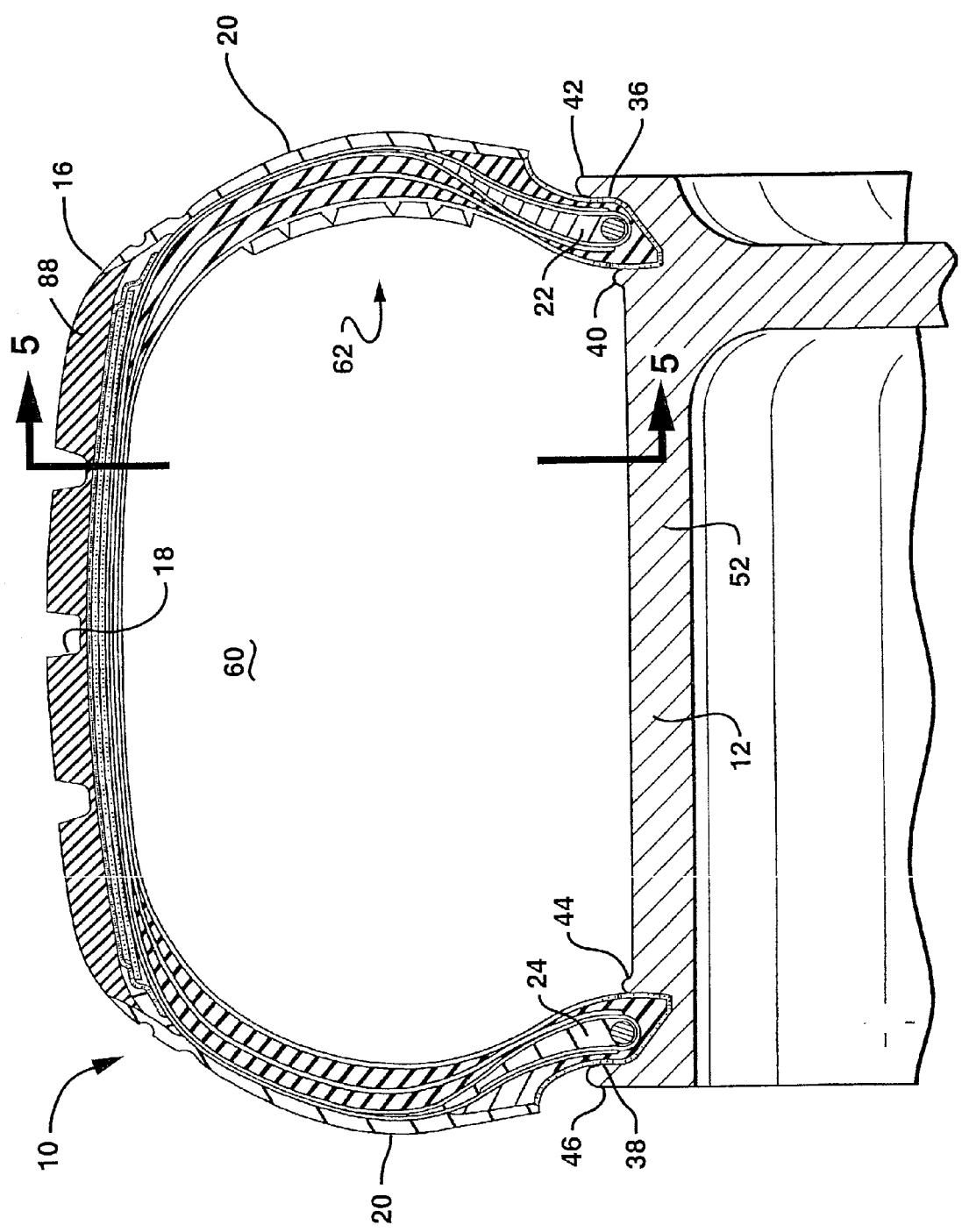
FIG. 3 is a partial cross sectional view of an exemplary embodiment of a tire assembly in accordance with the present invention. The view shows a low or no pressure use indicator being located on an inner sidewall of the tire, the tire having normal operational tire pressure.

FIG. 3 shows a partial cross section view of a tire assembly 10 in accordance with one exemplary embodiment of the present invention. Here, the sidewalls 20, along with a first and second bead 22 and 24 in addition to a crown 88 of the tire 16 are constructed in accordance with the design disclosed in the previously mentioned U.S. Pat. No. 5,427,166. The sidewalls disclosed in the '166 patent have several layers of rubber to help keep the tire from collapsing upon the loss of air pressure. A detailed explanation of the cross-sectional features of the tire 16 is not necessary for one to gain an appreciation of the teachings of the present invention. The present invention may be used with any cross-sectional configuration of the sidewalls 20, beads 22 and 24, and the crown 88, and the present invention is not limited to the particular configuration shown.

The tire 16 is provided with tire tread 18 on the outer surface. The tire tread 18 is formed on the crown 88 of the tire 16. The tire tread 18 used in the present invention may be of any variety, and is not limited to a particular type. The two sidewalls 20 extend from the crown 88 of the tire 16. As shown in this exemplary embodiment, the sidewalls 20 are substantially vertical in orientation once seated onto the wheel rim 12. The first bead 22 is present at the end of one of the sidewalls 20, and the second bead 24 is present at the other end of the other sidewall 20. The use of beads 22 and 24 help keep the tire 16 attached to the wheel having a rim 12 and also help to create an air seal to maintain tire pressure.

The wheel rim 12 has a first bead seat 36 and a second bead seat 38 formed therein for seating the first and second beads 22 and 24 respectively. The first bead seat 36 may be formed by a pair of humps 40 and 42. The second bead seat 38 may be formed by a pair of humps 44 and 46. It is to be understood, however, that the first bead seat 36 and the second bead seat 38 do not require the humps 40, 42, 44, and/or 46 to be present in other exemplary embodiments of the present invention.

Figure 4:
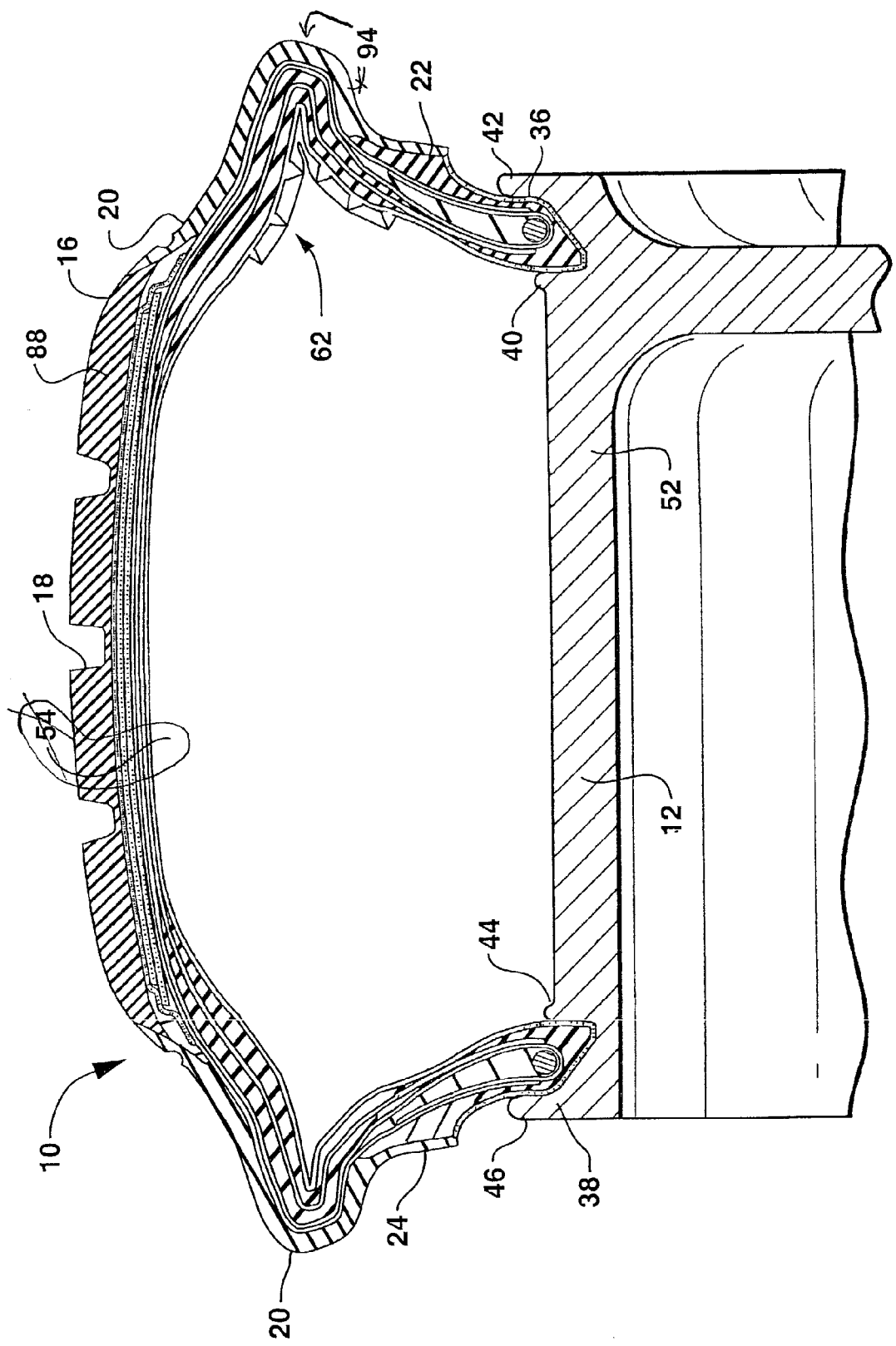
FIG. 4 is a partial cross sectional view along the same lines as the exemplary embodiment shown in FIG. 3, only having the tire being subjected to a low tire pressure condition. The tire and the low or no pressure use indicator are shown flexing in FIG. 4.

As shown in FIG. 3, the tire assembly 10 has a cavity 60 present within the tire 16. The cavity 60 is formed by having the tire 16 being at a normal operating pressure. FIG. 4 shows the tire assembly 10 of FIG. 3 when the operating pressure becomes low or zero. This causes the cavity 60 to be reduced as the crown 88 and other portions of the tire 16 collapse towards the rim 12. The sidewalls 20 flex along with the low pressure indicator 62.

The low or no pressure use indicator 62 is shown in FIG. 3 as being located on the inner surface of one of the sidewalls 20. The low or no pressure use indicator 62 is shown as being formed on the inner surface of this sidewall 20, but it is to be understood that the low or no pressure use indicator 62 may be either integrally molded with the sidewall 20 and tire 16, or as a separate piece attached later thereon. As can be seen in FIG. 4, the low or no pressure use indicator 62 deflects along with the sidewall 20 due to the attachment of the low or no pressure use indicator 62 to the sidewall 20.

In a condition of low or zero pressure, the sidewalls 20 of the tire 16 "bulge". The point of the largest deflection of the tire 16 in the direction of the axis 28 during a condition of low or zero pressure occurs in a location sometimes referred to in the art as an equator 94 of the tire 16. In one exemplary embodiment of the present invention, the low or no pressure use indicator 62 is located on the interior of the sidewall 20 at the equator 94 of the tire 16. It is sometimes the case that due to the maximum deflection of the tire 16 occurring at the equator 94 during periods of low pressure, the maximum stress or strains imparted onto the tire 16 will also occur at the equator 94. It may be desirable to detect the point of greatest stress in the tire 16. Another advantage of placing the low or no pressure use indicator 62 at the equator 94 is for the ease of convenience of the maintenance technician or motorist.

Additionally, it is also envisioned in the present invention to place multiple low or no pressure use indicator s 62 on other portions of the tire 16. For instance, several low or no pressure use indicator s 62 can be placed inside of the tire 16 both on the inner sidewall 20 and/or the inner crown 18 along with placing other low or no pressure use indicator s 62 on the outside of the sidewall 20. The present invention is not limited to a specific location of the low or no pressure use indicator 62.

Figure 5:
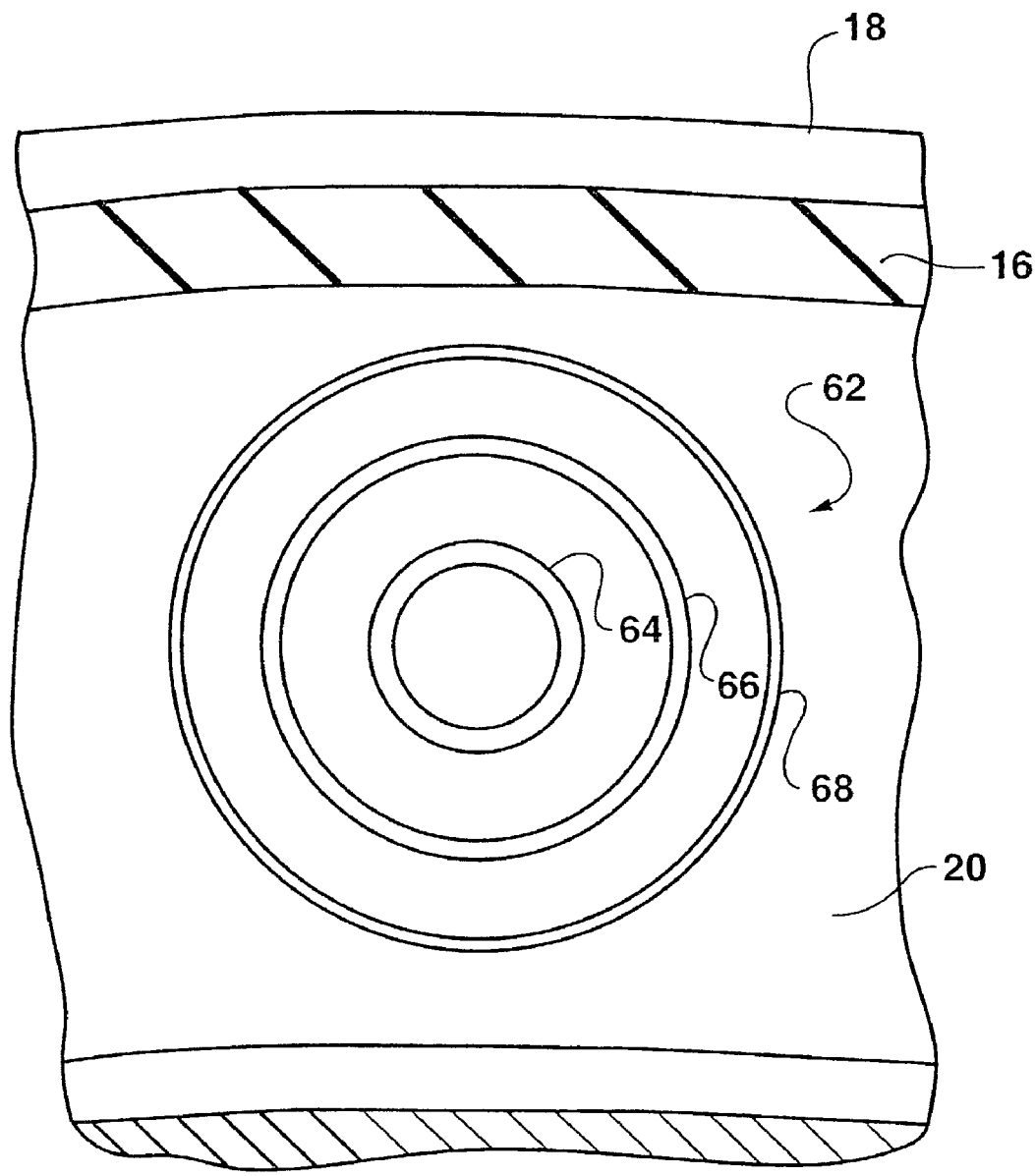
FIG. 5 is a cross section view taken along line 5—5 of FIG. 3 of an exemplary embodiment of a tire having a low or no pressure use indicator located thereon.

An exemplary embodiment of the low or no pressure use indicator 62 is shown in greater detail in FIG. 5. Here, the low or no pressure use indicator 62 is comprised of three concentric rings each having a different diameter. An inner ring 64 is present which is surrounded by a middle ring 66. An outer ring 68 surrounds both the middle ring 66 and the inner ring 64. These three rings 64, 66, and 68 are located on the inner surface of one of the sidewalls 20.

Figure 6:
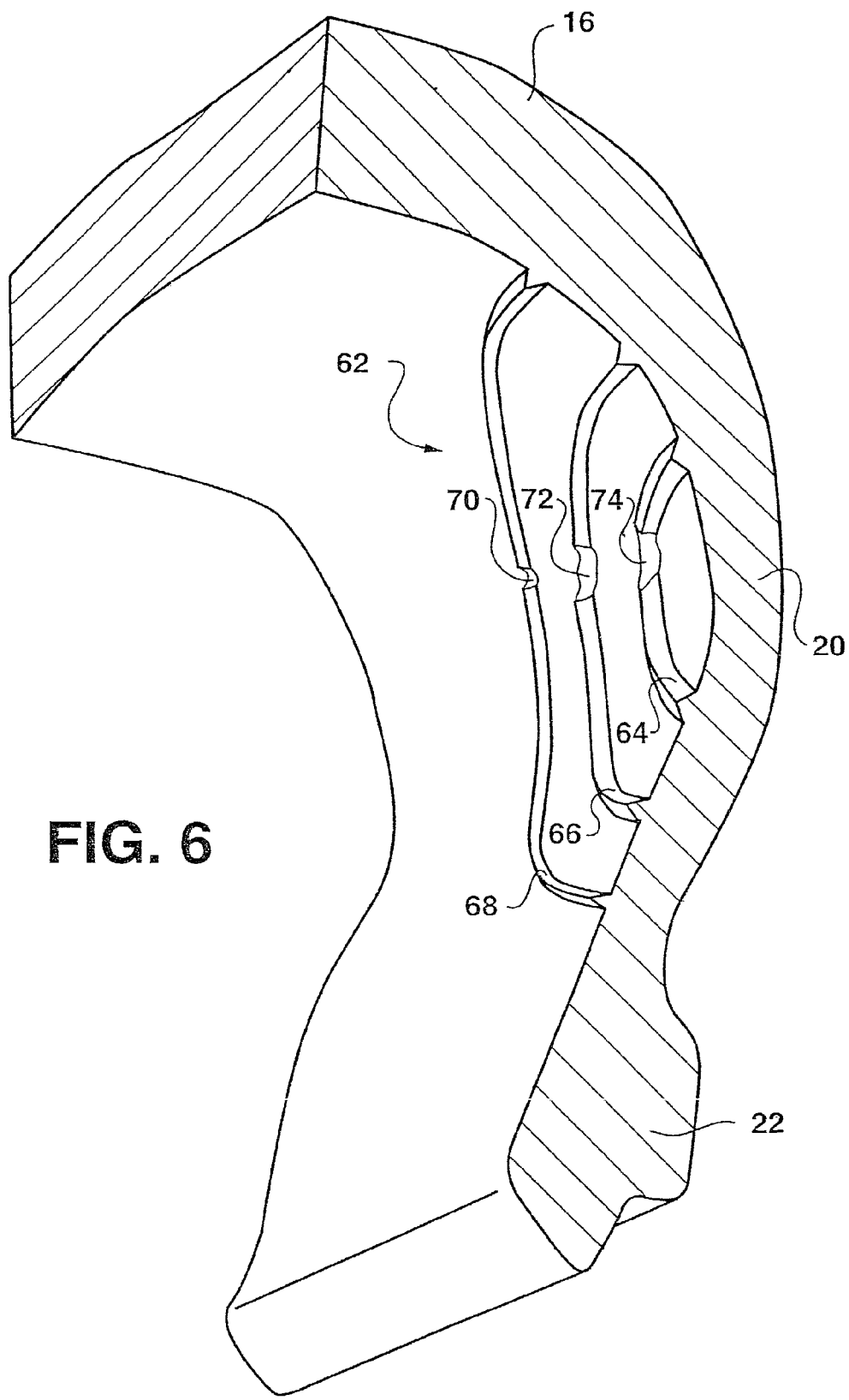
FIG. 6 is a partial perspective view of a tire in accordance with an exemplary embodiment of the present invention. The view shows the low or no pressure use indicator having a series of worn areas.

FIG. 6 shows a partial perspective view of a partial portion of the tire 16 having a low or no pressure use indicator 62 being similar to that shown in FIG. 5. Again, the low or no pressure use indicator 62 is a series of rings 64, 66, and 68 that are located concentrically about one another. However, the tire 16 shown in FIG. 6 is one that has been subjected to a condition of low or zero pressure. The low or no pressure use indicator 62 indicates that the tire 16 has been subjected to such a condition by a series of worn areas 70, 72, and 74 located on the rings 68, 66, and 64 respectively. The cracking of the raised rings 68, 66, and 64 provide a visual indication to the technician or motorist that the tire 16 has been subjected to a condition of low or zero pressure. The raised rings 68, 66, and 64 amplify the peak stresses and strains that are present within the interior surface of the sidewall 20 during a condition of low or zero pressure. After a specific period of low or zero pressure, the worn areas or notches 70, 72, and 74 begin to occur. This deterioration provides an easily detectable visual indicator to be used by a technician or motorist after the zero or low pressure condition in order to determine whether the tire 16 is fit for reuse. Such visual indication is advantageous over having the technician or motorist inspect the tire 16 for "wrinkles" or other signs of deterioration that may be more subjective and/or harder to locate. The worn areas 70, 72 and 74 may also be described as deteriorated in other exemplary embodiments of the invention, and it is to be understood that the word "worn" is broad enough to cover areas that are deteriorated.

A period of low or zero pressure causes an increased flex in the tire 16. The flexing of tire 16 brings about stresses which cause a permanent physical change in the low or no pressure use indicator 62. Ridges present in the low or no pressure use indicator 62 will develop gaps and/or grooves once subjected to a certain amount of stress.

Typically, the maximum stress or strain imparted on the tire 16 will be a circumferential line along the sidewall 20 of the tire 16. As can be seen in FIG. 6, this maximum stress or strain line causes the worn areas 70, 72, and 74 to be in a substantially straight line with respect to the circumferential direction of the tire 16. However, it may be the case that the locations of the maximum stress or strain occur in other directions in other tires 16. Therefore, the low or no pressure use indicator 62 has been advantageously designed in this exemplary embodiment of the present invention to be a series of rings 68, 66, and 64 that in effect allow for the intersection of the maximum stress or strain line in any direction.

Flexing of the tire 16 may create a stress concentration which will contact the low or no pressure use indicator 62 and break the low or no pressure use indicator 62 to form a worn area 70. The worn area 70 may indicate how hard and long the tire 16 has been driven after being subjected to a condition of low or zero pressure. The amount of distance driven by the vehicle during a period of low or zero tire pressure, which causes an amount of stress in the tire 16, may cause the worn area 70. The beginning of deterioration on the low or no pressure use indicator 62 along with the degree of the deterioration may depend on both the severity of the low or zero pressure incident as well as the geometry of the low or no pressure use indicator. For instance, the thickness and cross sectional shape of the rings 68, 66, and 64 may be selected to allow for the worn areas 70, 72, and 74 respectively to be formed once subjected to different conditions of low or zero pressure. The low or no pressure use indicator 62 may therefore be designed in one exemplary embodiment of the present invention to have the worn area 70 present if a moderate amount of low or zero pressure were imparted onto the tire 16. However, such an amount of low or zero pressure may not be enough to cause the tire 16 to be discarded. Additionally, the rings 66 and 64 may be constructed of such a geometry, size, and shape so that once the presence of the worn areas 72 and 74 are seen, the technician or motorist must replace the tire 16 due to the fact that an unacceptable amount of stress or strain had been imparted onto the tire 16.

Various configurations of the low or no pressure use indicator 62 are presented in accordance with the present invention such that the worn areas 70, 72, and 74 may be formed in response to various driving conditions. In one exemplary embodiment of the present invention, a run-flat tire 16 may have zero PSI present and be driven for a distance of between 50 to 100 kilometers in order for the start of deterioration of the low or no pressure use indicator 62 to begin. In such a case, under inflation "wrinkles" may also be present allowing for the low or no pressure use indicator 62 to be an auxiliary indicator of the condition of low pressure. As such, in other exemplary embodiments of the present invention, the low or no pressure use indicator 62 provides for a second way of determining whether the tire 16 has been subjected to a condition of low or zero pressure. The low or no pressure use indicator 62 may be a redundant system in other exemplary embodiments of the present invention. The low or no pressure use indicator 62 may be used on a regular or conventional tire in order to highlight the "wrinkles" in another exemplary embodiment of the present invention.

Although as shown as being three concentric rings 68, 66, and 64 in FIG. 7A, it is to be understood that the low or no pressure use indicator 62 may be of other configurations. For instance, the low or no pressure use indicator 62 may be formed in another exemplary embodiment by being a single ring as opposed to three rings. Additionally, any number of rings may be used in other exemplary embodiments. Additionally, the low or no pressure use indicator 62 does not need to be a ring, but may be in other exemplary embodiments a straight line. FIG. 7B shows another exemplary embodiment of the low or no pressure use indicator 62 where the low or no pressure use indicator 62 is formed by three substantially parallel lines 76. Again, any number of lines 76 may be used in other exemplary embodiments of the present invention.

FIG. 7C shows another exemplary embodiment of the low or no pressure use indicator 62 that includes a series of three triangles. An inner triangle 82 is present with a middle triangle 80 surrounding the inner triangle 82. An outer triangle 78 surrounds both the middle triangle 80 and the inner triangle 82. All three of the triangles 78, 80, and 82 share a common center point. However, it is to be understood that in other exemplary embodiments of the present invention, that the low or no pressure use indicator 62 may be comprised of any number of triangles 78, 80, and 82. For instance, a single triangle may be used in one exemplary embodiment while two triangles are used in another exemplary embodiment. The provision of triangles 78, 80, and 82 is similar to the provision of rings 68, 66, and 64 as shown in FIG. 7A in that a line of maximum stress or strain will contact at least a portion of one of the triangles 78, 80, and 82.

FIG. 7D shows yet another exemplary embodiment of the low or no pressure use indicator 62 in accordance with the present invention. Here, a series of three substantially parallel angled straight lines 84 intersect another series of angled substantially parallel straight lines 86. Again, a line of maximum stress or strain will contact one of these lines 84 and/or 86 to provide for the visual indication of a low or zero pressure instant.

Although several designs of the low or no pressure use indicator 62 are shown in FIGS. 7A–7D, the present invention includes other exemplary embodiments of the low or no pressure use indicator 62 that include other designs. For instance, the low or no pressure use indicator 62 may be in the form of a company logo or trademark. In fact, any conceivable design of the low or no pressure use indicator 62 is possible in accordance with the present invention. Additionally, the low or no pressure use indicator 62 may be a mark that can convey useful information in textual form, such as a brand name or inspection information. The low or no pressure use indicator 62 may be any geometric shape that is capable of being altered by low pressure flexing of the tire 16.

FIG. 8A shows a cross section of one exemplary embodiment of the low or no pressure use indicator 62. Here, the low or no pressure use indicator 62 has a V-shaped cross section 90. The V-shaped cross section 90 allows for the concentration of a maximum stress or strain to be imparted on the low or no pressure use indicator 62. This will cause the cracking or deterioration of the low or no pressure use indicator 62 to cause the visual indication to the technician or motorist. FIG. 8B shows another configuration of the cross section of the low or no pressure use indicator 62. Here, the low or no pressure use indicator 62 has a substantially V-shaped cross section 202 that has a circular member 92 at an apex 200. Such a cross section will also allow for deterioration of the low or no pressure use indicator 62 once a low or zero pressure incident occurs. Additionally, the present invention includes other exemplary embodiments of the low or no pressure use indicator 62 having various cross sections, and the present invention is not limited to a particular cross section.

The deterioration of the low or no pressure use indicator 62 will be dependent upon, but not limited to, the geometry, thickness, and/or the angle of the low or no pressure use indicator 62 relative to the circumferential direction of the tire 16. It has been found in one exemplary embodiment of the present invention that placing the low or no pressure use indicator 62 having lines in the circumferential direction of the tire does not provide for a favorable deterioration, resulting in a poor indication. Additionally, placing the low or no pressure use indicator 62 perpendicularly to the circumference also does not provide for an optimum indication. In one exemplary embodiment of the present invention the low or no pressure use indicator 62 is placed at a direction from 30 to 80 degrees from the circumferential direction of the tire 16. However, the present invention includes exemplary embodiments where the low or no pressure use indicator 62 is placed at the circumferential direction and/or perpendicular to the circumferential direction.

In another exemplary embodiment of the present invention, the low or no pressure use indicator 62 may be made of different colored rubber in order to highlight the deterioration of the low or no pressure use indicator 62. For instance, the low or no pressure use indicator 62 may be black and once the worn area 70 occurs, the rubber underneath may be red in order to highlight the deterioration.

It should be understood that the present invention provides one subjective indicator that may be used to indicate the undesirable operation of a tire at low or zero pressure. As such, it provides an additional but not exclusive way of determining whether a tire should be replaced.

It should be understood that the present invention includes various modifications that can be made to the embodiments of the low or no pressure condition indicator for a tire as described herein as come within the scope of the appended claims and their equivalents.

We claim:

1. A tire for use on a vehicle, comprising:
    a tire having a crown and a pair of sidewalls extending from said crown, each of said sidewalls having a bead located on an end of each said sidewall opposite from said crown; and
    a low or no pressure use indicator located on at least one of said sidewalls and integrally formed with the surface of said sidewall onto which said low or not pressure use indicator is located, said low or no pressure use indicator configured for indicating by a permanent physical change whether said tire has been subjected to an operation condition of an undesirable amount of low tire pressure,
    wherein the permanent physical change is fracturing.

2. The tire of claim 1, wherein said low or no pressure use indicator indicates the condition of an undesirable amount of low tire pressure by a worn area on said low or no pressure use indicator.

3. The tire of claim 1, wherein said low or no pressure use indicator is at least one raised ring on the inner surface of one of said sidewalls.

4. A tire for use on a vehicle, comprising:
    a tire having a crown and a pair of sidewalls extending from said crown, each of said sidewalls having a bead located on an end of each said sidewall opposite from said crown; and
    a low or no pressure use indicator located on at least one of said sidewalls, said low or no pressure use indicator configured for indicating by a permanent physical change whether said tire has been subjected to an operation condition of an undesirable amount of low tire pressure; and
    wherein said low or no pressure use indicator is at least a pair of raised rings on the inner surface of one of said sidewalls, one of said raised rings being inside the other of said raised rings.

5. The tire of claim 1, wherein said low or no pressure use indicator is three concentric raised rings on the inner surface of one of said sidewalls.

6. The tire of claim 1, wherein said low or no pressure use indicator is at least one raised line on the inside surface of one of said sidewalls.

7. The tire of claim 6, wherein said low or no pressure use indicator is three raised lines being substantially perpendicular to one another.

8. The tire of claim 1, wherein said low or no pressure use indicator is at least one raised triangle on the inner surface of one of said sidewalls.

9. The tire of claim 8, wherein said low or no pressure use indicator is three raised triangles all being of different size, the centers of all of said three triangles being located at a common point.

10. The tire of claim 1, wherein said low or no pressure use indicator is at least two intersecting raised lines on the inner surface of one of said sidewalls.

11. The tire of claim 10, wherein said low or no pressure use indicator is a series of three substantially parallel raised lines that intersect another series of three substantially parallel raised lines.

12. The tire of claim 1, wherein said low or no pressure use indicator has a V-shaped cross section.

13. The tire of claim 1, wherein said low or no pressure use indicator has a cross section that is substantially V-shaped having a circular member located at an apex.

14. The tire of claim 1, wherein said low or no pressure use indicator is located on an inner wall of one of said sidewalls at the equator of said tire.

15. The tire of claim 1, wherein at least a portion of said low or no pressure use indicator is located on the inner surface of one of said sidewalls at a point of between about 30° and about 80° from the circumferential direction of said tire.

16. The tire of claim 1, wherein said low or no pressure use indicator indicates a condition of an undesirable amount of low tire pressure by the presence of a colored surface.

17. The tire of claim 1, wherein said low or no pressure use indicator is a raised member that permanently physically changes when subjected to an operation condition of an undesirable amount of low tire pressure.

18. The tire apparatus of claim 1, wherein said tire is a vertically anchored tire.

19. A tire for use on a vehicle, comprising:
    a tire having a crown and a pair of sidewalls extending from said crown, each of said sidewalls having a bead located on an end of said sidewall opposite from said crown; and
    a low or no pressure use indicator located on an inner wall of one of said sidewalls and integrally formed with the surface of said inner wall onto which said low or no pressure use indicator is located, said low or no pressure use indicator configured for indicating whether said tire has been subjected to an operation condition of an undesirable amount of significantly low tire pressure, said low or no pressure use indicator indicating the condition of an undesirable amount of significantly low tire pressure by an area subject to wear during significantly low pressure use, said low or no pressure use indicator being a raised ridge pattern on the inner surface of one of said sidewalls, wherein the cross-sectional shape of said raised ridge pattern is configured so as to amplify stress such that a portion of said raised ridge pattern is fractured due to the amplified stress to indicate the condition of an undesirable amount of significantly low tire pressure, wherein said worn area being a series of linearly aligned notches in said low or no pressure use indicator along a line of maximum stress in said tire during the condition of an undesirable amount of significantly low tire pressure.

* * * * *

UNITED STATES PATENT AND TRADEMARK OFFICE
CERTIFICATE OF CORRECTION

| | | |
|---|---|---|
| PATENT NO. | : 6,994,133 B2 | Page 1 of 1 |
| APPLICATION NO. | : 10/262260 | |
| DATED | : February 7, 2006 | |
| INVENTOR(S) | : Walter Lee Willard, Jr., Kenneth Johnson and Richard Bryant | |

It is certified that error appears in the above-identified patent and that said Letters Patent is hereby corrected as shown below:

Col. 9:
Claim 1, Line 49 should read as follows:

--... onto which said low or no pressure ...--

Signed and Sealed this

Twenty-ninth Day of May, 2007

JON W. DUDAS
*Director of the United States Patent and Trademark Office*